US006317127B1

(12) United States Patent
Daily et al.

(10) Patent No.: US 6,317,127 B1
(45) Date of Patent: Nov. 13, 2001

(54) MULTI-USER REAL-TIME AUGMENTED REALITY SYSTEM AND METHOD

(75) Inventors: Michael J. Daily, Thousand Oaks; David W. Payton, Woodland Hills, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/731,542

(22) Filed: Oct. 16, 1996

(51) Int. Cl.[7] .............................. G06T 11/60; H04N 9/47
(52) U.S. Cl. ............................................. 345/435; 348/143
(58) Field of Search .................................... 345/1–3, 7, 8, 345/425, 427, 419, 435; 348/442, 746, 113, 115, 143, 144

(56) References Cited

U.S. PATENT DOCUMENTS

| | | | |
|---|---|---|---|
| 5,384,588 | * 1/1995 | Martin et al. | 348/15 |
| 5,422,653 | 6/1995 | Maguire, Jr. | 345/9 |
| 5,488,675 | * 1/1996 | Hanna | 382/284 |
| 5,748,194 | * 5/1998 | Chen | 345/427 |
| 5,841,439 | * 11/1998 | Pose et al. | 345/418 |
| 5,905,499 | * 5/1999 | McDowall et al. | 345/419 |

FOREIGN PATENT DOCUMENTS

| | | | |
|---|---|---|---|
| 0 592 652 A1 | 4/1994 | (EP) | H04N/13/00 |
| 0 696 018 A2 | 2/1996 | (EP) | G06T/15/00 |
| 2 289 820 | 11/1995 | (GB) | H04N/5/262 |
| WO 96/21321 | 7/1996 | (WO) | H04N/13/04 |

OTHER PUBLICATIONS

Warren Robinett, "Interactivity and Individual Viewpoint in Shared Virtual Worlds: The Big Screen vs. Networked Personal Displays," Computer Graphics, US, ACM, vol. 28, No. 2, May 1994, pp. 127–130.

Hirose et al., Transmission of Realistic Sensation: Development of Virtual Dome, *IEEE Vrais*, vol. 1363, Jan. 1993, pp. 125–131.

"Virtual Reality: Scientific and Technological Challenges", National Research Council, Nathaniel Durlach and Anne Mavor, Eds, National Academy Press, 1995, pp. 17–23.

Orlando et al., "GPS–Squitter: System Concept, Performance, and Development Program", *The Laboratory Journal*, vol. y, No. 2, 1994, pp. 271–293.

"i–glasses", *Virtual I/O, Inc. Brochure*, 1994.

"ClearVue Low–Cost Helmet–Mounted Display", *Hughes Training, Inc. Brochure*, Link Division, 1995.

"Alphatron Affordable 3D Sound", *Crystal River Engineering Brochure*, 1995.

"Molly", Fakespace, Inc. Brochure, 1995.

* cited by examiner

*Primary Examiner*—William A. Cuchlinski, Jr.
*Assistant Examiner*—Thu Nguyen
(74) *Attorney, Agent, or Firm*—V. D. Duraiswamy; M. W. Sales

(57) ABSTRACT

A high resolution real-time multi-user augmented reality system broadcasts a wide FOV video signal from a plurality of image sources over a distribution bus to a plurality of users that independently select and view different portions of the video signal such that the angular resolution of the displayed video signal is constant over the range of possible viewing orientations. This is accomplished by assuming that each user's position is fixed at the center of a virtual sphere, the image sources' positions are known relative to the center of the virtual sphere, and that the users are looking at a portion of the inner surface of the sphere. As a result, the "flat" images generated by the image sources and the "flat" images viewed by the users can be efficiently mapped onto the virtual sphere and represented as index pairs (d,n). Thus, each user extracts those pixels on the virtual sphere corresponding to the user's current FOV and remaps them to a flat display. The video signals can be augmented with synthetic point-of-interest data such as visual overlays or audio messages that are registered to the video.

15 Claims, 8 Drawing Sheets

MULTI-USER REAL-TIME AUGMENTED REALITY SYSTEM AND METHOD

BACKGROUND OF THE INVENTION

1. Field of the Invention

The present invention generally relates to interactive image viewing systems, and more specifically to an image viewing system that broadcasts images, augmented with point-of-interest overlays, over a video bus to multiple local users, which simultaneously extract and display different viewpoints of the images in real time with a uniform angular resolution over all viewer orientations.

2. Description of the Related Art

Known interactive image viewing systems allow a single person to view his surroundings through an external camera where those surroundings are either remotely located or otherwise occluded from view. Typically, the person wears a head mounted display (HMD), which is fitted with a tracking device that tracks the movement of the person's head. The HMD displays the portion of the surroundings that corresponds to the person's current viewpoint, i.e. head position.

Fakespace, Inc. produces a teleoperated motion platform, the MOLLY™, which is used for telepresence and remote sensing applications. The user wears a HMD to view his surroundings. An external stereo camera setup is slaved to the user's head movement so that the cameras track his head movement and provide the desired view of the surroundings. The user's field-of-view (FOV) is approximately 350°, of which the user can view approximately 80° at any one time using Fakespaces's BOOM head-coupled display. By slaving camera movement to head position, the displayed image is optimal in the sense that it is the same as if the user turned and looked in that direction absent any occlusion. As a result, the angular resolution of the displayed image is the same at any viewing orientation. However, because the external camera is slaved to a particular user's head movement, the system is limited to a single user and does not support multiple views simultaneously In a more general application of the slaved camera if the camera is remotely located from the user, the time delay between head movement and image presentation is distracting. If the time delay exceeds a certain limit the user will be unable to experience realistic sensations of interacting with the imagery, may lose his sense of orientation, and in the worst case, may even experience motion sickness.

To address the time delay problem, Hirose et al developed a "Virtual Dome" system, which is described in "Transmission of Realistic Sensation: Development of a Virtual Dome" IEEE VRAIS pp. 125–131, January 1993. In the Virtual Dome system, a single external camera pans and tilts to capture a complete image of the surrounding area. The component images are transmitted to a graphics workstation that texture maps them onto a set of polygons that construct a spherical dome, which in turn provides a virtual screen. By using the HMD, the user can experience remote synthetic sensations by looking around inside the virtual screen.

Due to the intense complexity of the texture mapping process, the user requires a graphics workstation to construct the virtual screen, the image resolution is quite low, and the response to head movements is not real-time. To improve response time, once the system has generated an entire image the camera is then slaved to the user's head movement. As a result, when the user changes his head orientation, he will initially see previously obtained images for only a few seconds until the texture mapping process can recover. However, by slaving the camera motion to the user the system is limited to a single user.

A related technology is embodied in "Virtual Reality" systems, as described in "Virtual Reality: Scientific and Technological Challenges" National Research Council, Nathaniel Durlach and Anne Mavor, Eds, National Academy Press, 1995, p. 17–23. In Virtual Reality systems a single user interacts with computer generated imagery. The user's actions change not only his view of the imagery but the imagery itself.

SUMMARY OF THE INVENTION

The present invention provides a high resolution real-time multi-user augmented reality system in which the angular resolution of the displayed video signal is constant over the range of possible viewing orientations.

This is accomplished by assuming that each user's position is fixed at the center of a virtual sphere, the image sources' orientations are known relative to the center of the virtual sphere, and that the users are looking at a portion of the inner surface of the sphere. As a result, the "flat" images generated by the image sources and the "flat" images viewed by the users can be efficiently mapped onto the virtual sphere and represented as index pairs (d,n). Thus, each user extracts those pixels on the virtual sphere corresponding to the user's current field-of-view (FOV) and remaps them to a flat display. The video signals can be augmented with synthetic point-of-interest data such as visual overlays or audio messages that are registered to the video. The mapping directly provides the desired uniform angular resolution as well as distortion correction, which would normally be computed independently. In addition, the simplicity of the mapping itself and the resulting representation on the virtual sphere support high resolution video, real-time response and multiple users.

In a preferred embodiment, an airplane is fitted with a wide FOV sensor system that provides a plurality of video signals at known positions and orientations in a reference coordinate system ($\vec{x}, \vec{y}, \vec{z}$), a global positioning system (GPS) that provides the airplane's position and heading, and a point-of-interest data base. The video signals are each mapped onto a virtual sphere in the reference coordinate system such that each sensor pixel $(s,x_s,y_s,i)$, where s identifies the sensor, $(x_s,y_s)$ are the pixel coordinates, and i is the pixel intensity, is represented as a triplet (d,n,i) where (d,n) is an indexed pair that specifies the spherical coordinates on the virtual sphere at a fixed angular resolution $\alpha$. The triplets are continuously broadcast over a video bus to the passengers on the airplane. Similarly, the visual and audio overlay data in the system's wide FOV is extracted from the point-of-interest data base, mapped into (d,n) index pairs and broadcast over an overlay bus.

Each passenger has a HMD that tracks the movement of the passenger's head and displays a "flat" subimage of the broadcast video signal. A local processor responds to the head movement by mapping the subimage pixels to the corresponding portion of the virtual sphere to identify the range of (d,n) values encompassed in the passenger's local FOV. Thereafter, the local processor downloads those triplets (d,n,i) in the local FOV, remaps them to the passenger's image plane $(x_u,y_u,i)$ pixel coordinates, and transmits them to the HMD for display. Alternatively, the $(s,x_s,y_s,i)$ pixels can be broadcast over the video bus with the local processor performing both spherical mappings. This increases the number of computations but allows the angular resolution of the displayed subimage to adapt to each passenger's focal length. Furthermore, because the overlay data has a relatively low information content relative to the video data, each passenger could interact directly with the point-of-interest data base to retrieve only the desired overlays in the current local FOV.

For a better understanding of the invention, and to show how the same may be carried into effect, reference will now be made, by way of example, to the accompanying drawings.

DETAILED DESCRIPTION OF THE INVENTION

The present invention provides an augmented reality system that generates a wide FOV video signal, augments it with overlay symbols that correspond to points-of-interest in the video signal, and broadcasts it over a bus to multiple local displays which allow the users to select and view different portions of the video signal. In a particular embodiment, a sensor array is attached to the bottom and/or the top of an airplane such that the passengers can view the outside world in real-time as if the airplane was invisible. In an alternative embodiment, a computer replays a previously recorded video signal over a bus to multiple users who are equipped with HMDs. This allows students in a classroom, for example, to experience the flight in a virtual environment in which they control their local FOVs.

Figure 1:
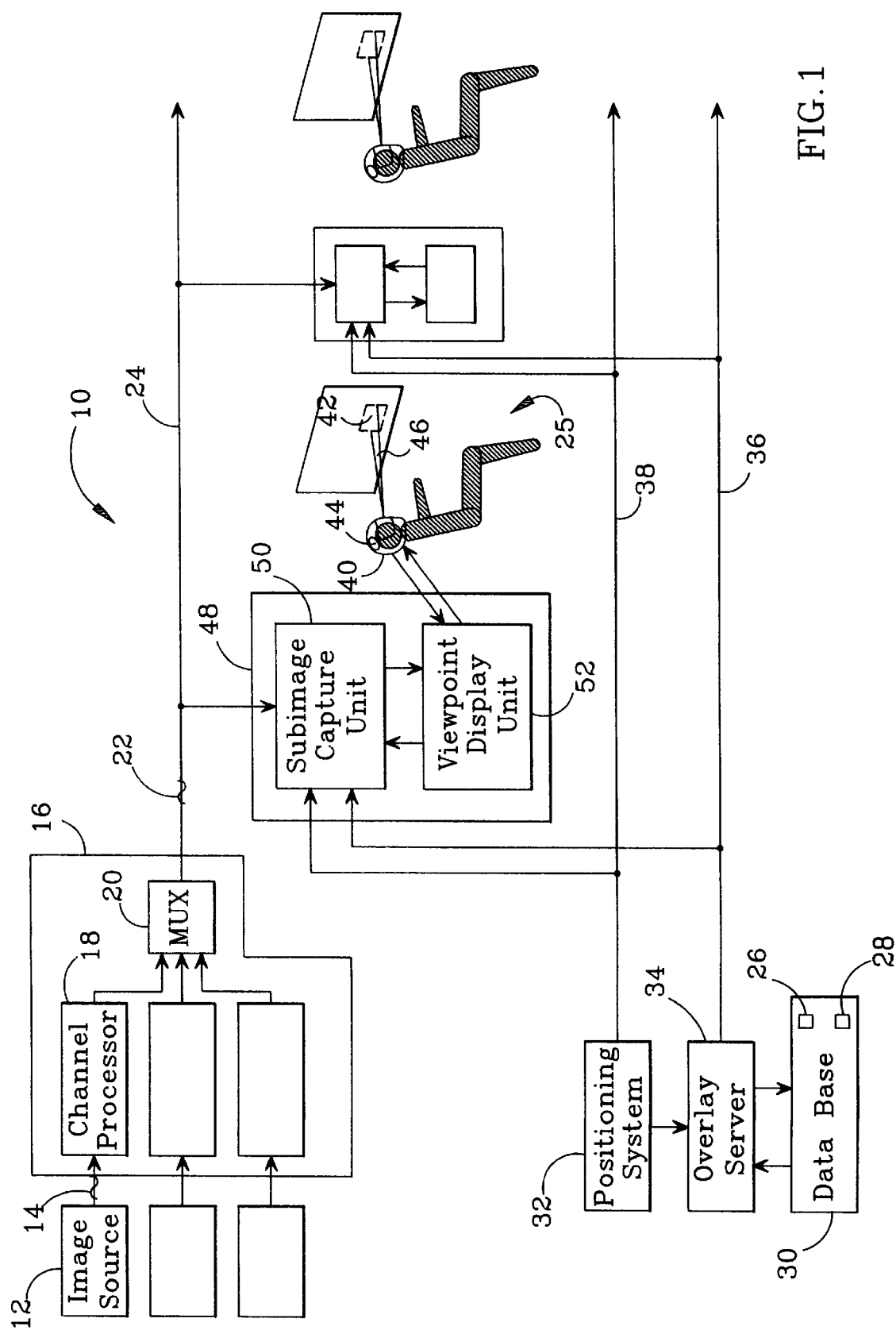
FIG. 1 is a block diagram for a multi-user augmented reality system in accordance with the present invention.

As shown in FIG. 1, a multi-user real-time augmented reality system 10 generates and distributes a wide FOV video signal to a plurality of users that independently select and view different portions of the video signal. The video signal is augmented with overlay symbols that are registered to landmarks in the video signal. This is accomplished by assuming that each user's position is fixed at the center of a sphere, the image sources' positions are known relative to the center of the sphere, and that the users are looking at different portions of the inner surface of the sphere as shown in detail in FIGS. 2–4. As a result, the "flat" images $(x_u, y_u)$ generated by the image sources and the "flat" images $(x_u, y_u)$ viewed by the users can be mapped onto a virtual sphere and represented as (d,n) index pairs. Thus, each user extracts those pixels on the virtual sphere corresponding to the user's current FOV and remaps them to a flat display. The mapping directly provides the desired uniform angular resolution as well as distortion correction. In addition, the simplicity of the mapping itself and the resulting representation on the sphere support high resolution video, real-time response and multiple users.

The augmented reality system 10 includes a plurality of image sources 12 at known orientations in a reference coordinate system ($\vec{x}, \vec{y}, \vec{z}$) (shown in detail in FIG. 3) that generate respective video signals 14 having pixels $(s, x_s, y_s, i)$ where s identifies the image source, $(x_s, y_s)$ are the cartesian coordinates of the image source, and i is a pixel intensity. The image sources 12 can be sensors such as CCD cameras that sense real imagery or computers that generate synthetic imagery. A source processor 16 includes individual channel processors 18 that group the pixels into packets and a multiplexer 20 that multiplexes the packets into a wide FOV video signal 22. In a low complexity, fixed angular resolution system, the individual channel processors 18 map the individual pixels $(s, x_s, y_s, i)$ into triplets (d,n,i) that are multiplexed into the video signal 22. In a higher complexity, variable angular resolution system, the pixel data is directly multiplexed into the video signal 22. The video signal 22 is broadcast over a video distribution channel 24 such as a bus or a network to a plurality of users 25.

The wide FOV video signal 22 is preferably augmented with overlay symbols 26 and/or audio tracks 28 that are registered to landmarks in the video signal. A database 30 such as ARCINFO® includes different classes of overlay symbols, in which each class is organized in a hierarchy of symbols. The selected level in the hierarchy changes as a user 25 zooms in and out on the video signal such that the amount of detail follows the resolution of the displayed video signal. The overlay symbols are tagged with their respective positioning coordinates in a global coordinate system, for example, longitude and latitude coordinates. The overlay symbols 26 represent general landmarks such as mountains or cities or specific landmarks such as building or streets. The audio tracks 28 are registered to different landmarks and convey historical information of a region or particular overlay symbol, current events in a particular city, or even directions to a user's hotel. A user can interact with the database to select different class of overlay symbols such as geographical landmarks, hotels or restaurants or audio tracks such as local history or current events in a particular city.

A positioning system 32 provides the current position and heading from which the wide FOV video signal is generated. For example, where the system is implemented on an airplane, as shown in detail in FIG. 10, the positioning system 32 includes a Global Positioning System (GPS) that provides the latitude, longitude, and altitude of the plane, and a gyro compass that provides the plane's heading including yaw, pitch, and roll. When the video signal is generated synthetically, the positioning and heading information will be stored and registered to the signal.

An overlay distribution processor 34 interacts with the positioning system 32, the database 30, and each user 25 to select the appropriate geographical range, class and hierarchical level of symbols and/or audio tracks for each user. In one embodiment, the distribution processor 34 uses the position and heading information to determine which overlay symbols and audio tracks lie within the current wide FOV, extracts all of those symbols and audio tracks, registers them to the wide FOV video signal, and distributes them over a overlay distribution bus 36. The individual users in turn extract those symbols that correspond to their current FOV and overlay preferences. Alternatively, each user can interact directly with the distribution processor 34 to specify the user's FOV, desired classes and display resolution. In response, the distribution processor only extracts and broadcasts the required symbols and/or audio tracks. Similar to the wide FOV video signal, the symbol coordinates can be broadcast in their cartesian coordinates or their index pairs (d,n). In the former case, the positioning and heading information is broadcast over a data bus 38 to the users where the registration and coordinate transformations are calculated.

Each user 25 is provided with a display such as an HMD 40 for displaying a subimage 42 of the wide FOV video signal 22 and a user controllable viewpoint selector such as a head tracker 44 for tracking the user's head movement in spherical coordinates (ρ,θ,φ)to select a user FOV 46 from the wide FOV video signal. A local processor 48 responds to the current user FOV 46 by extracting that portion of the video signal 22 that lies in the user FOV and its registered symbols 26, maps it into the user's coordinate system $(x_u,y_u)$, and transmits the subimage 42 to the HMD 40. The local processor 48 includes a subimage capture unit 50 that downloads the data from the video and overlay distribution buses 24 and 36 and stores it in a buffer. The subimage capture unit preferably downloads an oversized subimage such that the tables used to extract the data off the buses do not have to be updated for small changes in the user's FOV. This reduces the number of computations and reduces the potential for glitches in the displayed subimage. A viewpoint display unit 52 reads out the video and overlay data from the buffer for the current user FOV and transmits the subimage to the HMD.

Figure 2:
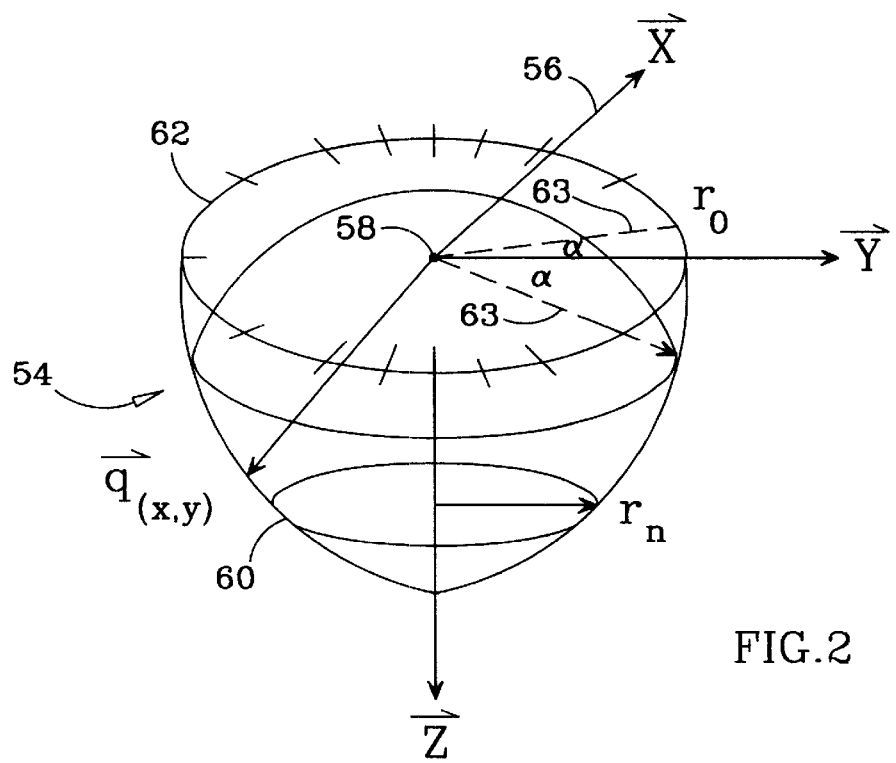
FIG. 2 is a perspective view of a virtual sphere (not shown in its entirety) in a reference coordinate system.

FIG. 2 shows a virtual sphere 54 (not shown in its entirety in a reference coordinate system $(\vec{x},\vec{y},\vec{z})$ 56. For simplicity, the virtual sphere is assumed to be a unit sphere and its center 58 is defined to coincide with the (0,0,0) point in the reference coordinate system. The virtual sphere is indexed into (d,n) index pairs by subdividing each hemisphere into N concentric rings 60 and further subdividing the $n^{th}$ concentric ring into $D_n$ equally spaced segments 62 around the ring such that the angular resolution in both dimensions (ρ,θ) is α as indicated by broken lines 63. Given the desired angular resolution the number of rings in each hemisphere is:

$$N=\text{Floor }(\pi/2\alpha) \quad (1)$$

where Floor () calculates the greatest integer that is less than or equal to the argument. By definition, the radius of the $0^{th}$ ring is 1 in a unit sphere. It follows that the radius of the $n^{th}$ ring is $r_n=\cos(n\alpha)$. The number of segments around the $0^{th}$ ring is $D_0=(2\pi/\alpha)=4N$ for $n\alpha<\pi/2$. It follows that the number of segments around the nth ring is:

$$D_n=(D_0 r_n/r_0)=D_0\cos(n\alpha) \quad (2)$$

As a result, points on the virtual sphere are represented with uniform angular resolution α as (d,n) index pairs where the value of n designates the ring and d designates the segment on the $n^{th}$ ring. The angular resolution α can be set at any desired resolution by manipulating N and can made substantially continuous, e.g. within floating point accuracy, by setting N very large.

Points on the virtual sphere can also be represented as vectors $\vec{q}$ in the reference coordinate system $(\vec{X},\vec{Y},\vec{Z})$ that connect the center 58 of the sphere to points on the sphere. The points (d,n) are mapped from the spherical to the vector representation $\vec{q}(d,n)$ in accordance with:

$$q_x = \cos\left(\frac{2\pi D}{D_n}\right)\cos\left(\frac{\pi n}{2N}\right) \quad (3)$$

$$q_y = \sin\left(\frac{2\pi d}{D_n}\right)\cos\left(\frac{\pi n}{2N}\right), \text{ and} \quad (4)$$

$$q_z = \sin\left(\frac{\pi n}{2N}\right) \quad (5)$$

where $(q_x,q_y,q_z)$ are the x,y,z components, respectively, of the vector $\vec{q}$. The inverse mapping from the vector representation to the spherical is given as follows:

$$n = \frac{2N}{\pi}\sin^{-1}(q_z) \quad (6)$$

$$d = \frac{D_n}{2\pi}\tan^{-1}(q_x, q_y) \quad (7)$$

where $\tan^{-1}(q_x,q_y)$ equals $$\cos^{-1}\left(\frac{q_x}{\sqrt{q_x^2+q_y^2}}\right)$$

if $q_y \geq 0$ and equals $$2\pi - \cos^{-1}\left(\frac{q_x}{\sqrt{q_x^2+q_y^2}}\right)$$

if $q_y<0$.

Figure 3:
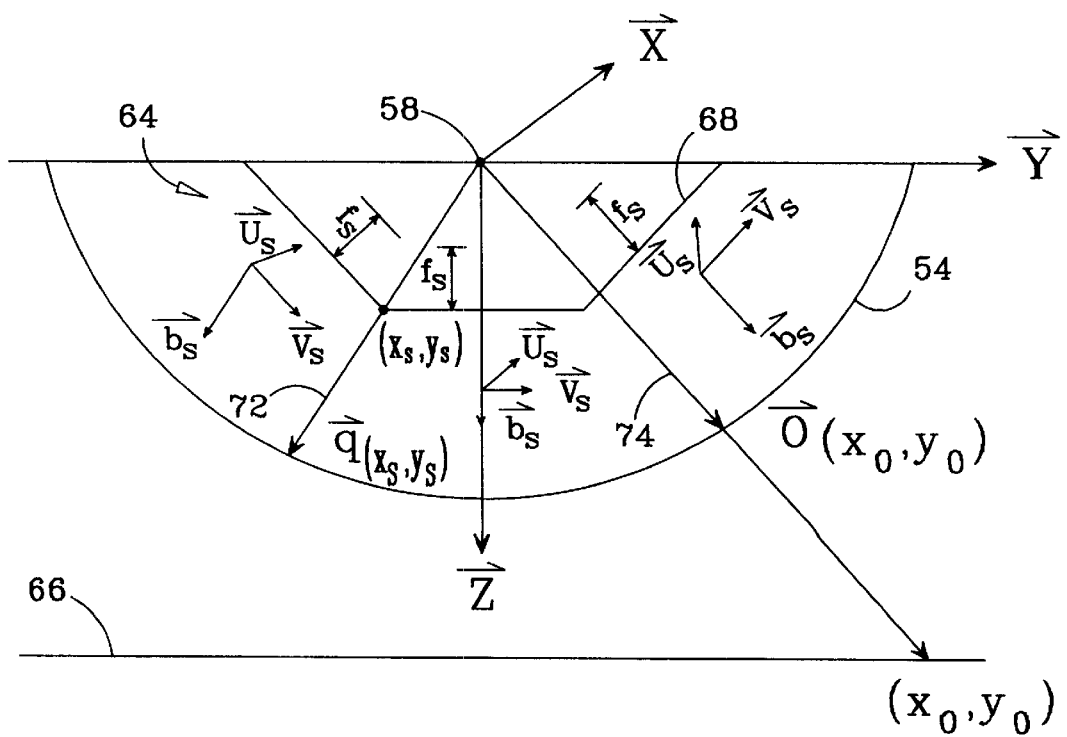
FIG. 3 is a sectional view of a sensor configuration in the reference coordinate system with a known orientation with respect to the center of the virtual sphere.

FIG. 3 is a sectional view of a sensor array 64 for imaging a region 66 of the Earth, for example. Each sensor 68 in the array has a known orientation (ρ,θ,φ) in the reference coordinate system $(\vec{x},\vec{y},\vec{z})$ with respect to the center 58 of the virtual sphere 54. Each sensor 68 has its own coordinate system $(\vec{U}_s,\vec{V}_s,\vec{b}_s)$ 70 where $\vec{b}_s$ is a boresight vector that is perpendicular to the plane of the sensor and $\vec{U}_s,\vec{V}_s$ are orthogonal vectors in the plane. The different coordinate systems $(\vec{U}_s,\vec{V}_s,\vec{b}_s)$ are each uniquely defined in terms of the reference coordinate system $(\vec{x},\vec{y},\vec{z})$ by the matrix relationship described in equation 8:

$$\begin{bmatrix}U_s\\V_s\\\overline{b}\end{bmatrix}=\begin{bmatrix}\cos\phi\sqrt{1-\sin^2\rho\sin^2\theta} & -\sin\phi\sqrt{1-\sin^2\rho\cos^2\theta} & \sin\rho(\sin\theta\cos\phi-\cos\theta\sin\phi)\\\sin\phi\sqrt{1-\sin^2\rho\sin^2\theta} & \cos\phi\sqrt{1-\sin^2\rho\cos^2\theta} & \sin\rho(\sin\theta\cos\phi-\cos\theta\sin\phi)\\-\sin\rho\sin\theta & \cos\rho & -\sin\rho\cos\theta\end{bmatrix}\begin{bmatrix}\overline{x}\\\overline{y}\\\overline{z}\end{bmatrix} \quad (8)$$

As a result, each sensor's artesian coordinates $(x_s,y_s)$ can be mapped into vectors $\vec{q}(s,x_s,y_s)$ 72 from the center of the virtual sphere to a point on the virtual sphere using the following equations:

$$x' = \frac{x_s - x_{off}}{f_s} \quad (9)$$

$$y' = \frac{y_s - y_{off}}{f_s} \quad (10)$$

-continued $$\vec{q}(s, x_s, y_s) = \frac{\vec{b}_s - \vec{V}_s y' - \vec{U}_s x'}{\|\vec{b}_s - \vec{V}_s y' - \vec{U}_s x'\|} \quad (11)$$

where $x_{off}$ and $y_{off}$ are the offsets from the upper left hand corner of the sensor to its center and $f_s$ is its focal length.

The overlay symbols and audio tracks are registered to the video signal by mapping their coordinates to vectors $\vec{o}(x_o, y_o)$ 74 on the virtual sphere. This is accomplished by first computing a vector between the center of the sphere in terms of its longitude, latitude, and altitude and the coordinates of the overlay symbol, applying a rotational transformation to compensate for the yaw, pitch, and roll of the sensor array, if applicable, and normalizing the vector to identify a point on the virtual sphere. As a result, landmarks in the video signal and their overlay symbols are registered to approximately the same point on the virtual sphere.

Figure 4:
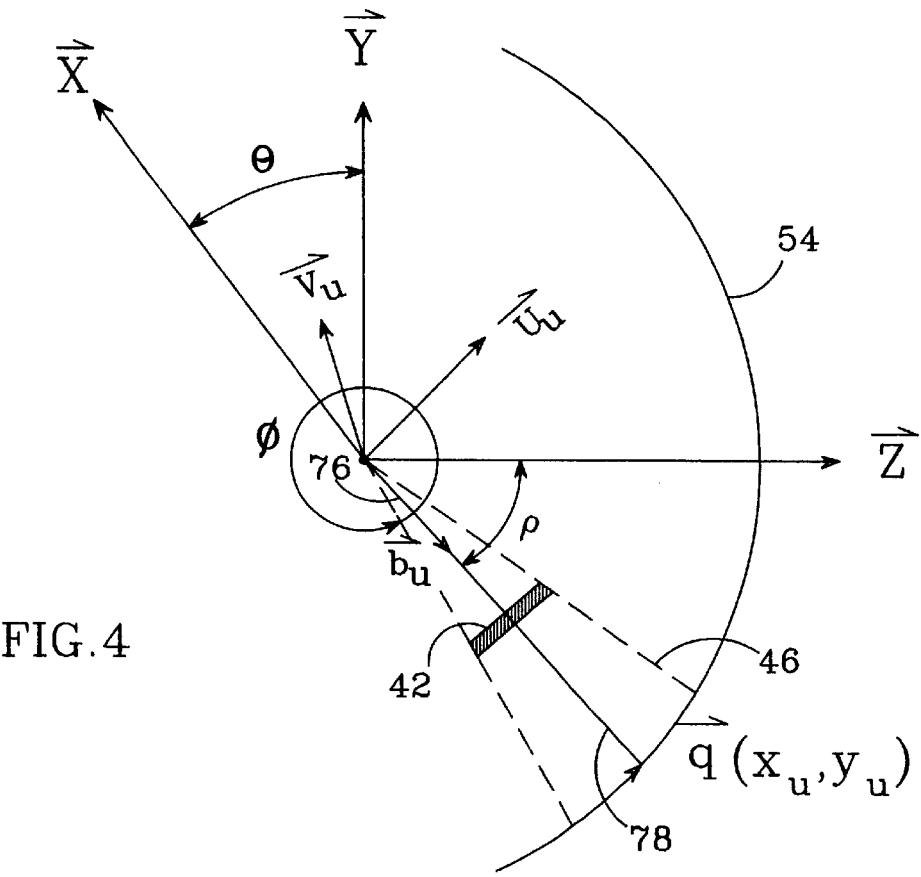
FIG. 4 is a sectional view of a user's local display in the reference coordinate system and its mapping onto a portion of the virtual sphere.

As shown in FIG. 4, each user has a coordinate system $(\vec{U}_u, \vec{V}_u, \vec{b}_u)$ 76 where $\vec{b}_u$ is a boresight vector that is perpendicular to the displayed subimage 42 and $\vec{U}_u, \vec{V}_u$ are orthogonal vectors in the plane of the subimage. The vertex (0,0,0) of the coordinate system is fixed at the center 58 of the virtual sphere 54, but the component vectors track the user's head movement $(\rho, \theta, \phi)$ that defines the current user FOV 46 as the user looks around inside the virtual sphere where $\rho$ represents up-and-down movement, $\theta$ represents left-to-right movement, and $\phi$ represents side-to-side tilt.

The user's coordinate system $(\vec{U}_u, \vec{V}_u, \vec{b}_u)$ is continuously updated in terms of the fixed reference coordinate system $(\vec{x}, \vec{y}, \vec{z})$ using the matrix relation shown in equation 8. The only difference being that the $(\rho, \theta, \phi)$ values for the users change constantly whereas the $(\rho, \theta, \phi)$ values for the sensors are fixed.

The user's image plane cartesian coordinates $(x_u, y_u)$ are mapped into vectors $\vec{q}(s, x_u, y_u)$ 78 from the center of the virtual sphere to a point on the virtual sphere using the following equations:

$$x'' = \frac{x_u - x_{off1}}{f_u} \quad (12)$$

$$y'' = \frac{y_u - y_{off1}}{f_u} \quad (13)$$

$$\vec{q}(x_u, y_u) = \frac{\vec{b}_u - \vec{V}_u y'' - \vec{U}_u x''}{\|\vec{b}_u - \vec{V}_u y'' - \vec{U}_i x''\|} \quad (14)$$

where $x_{off1}$ and $y_{off1}$ are the offsets from the upper left hand corner of the subimage to its center and $f_u$ is the user's focal length.

Figure 5:
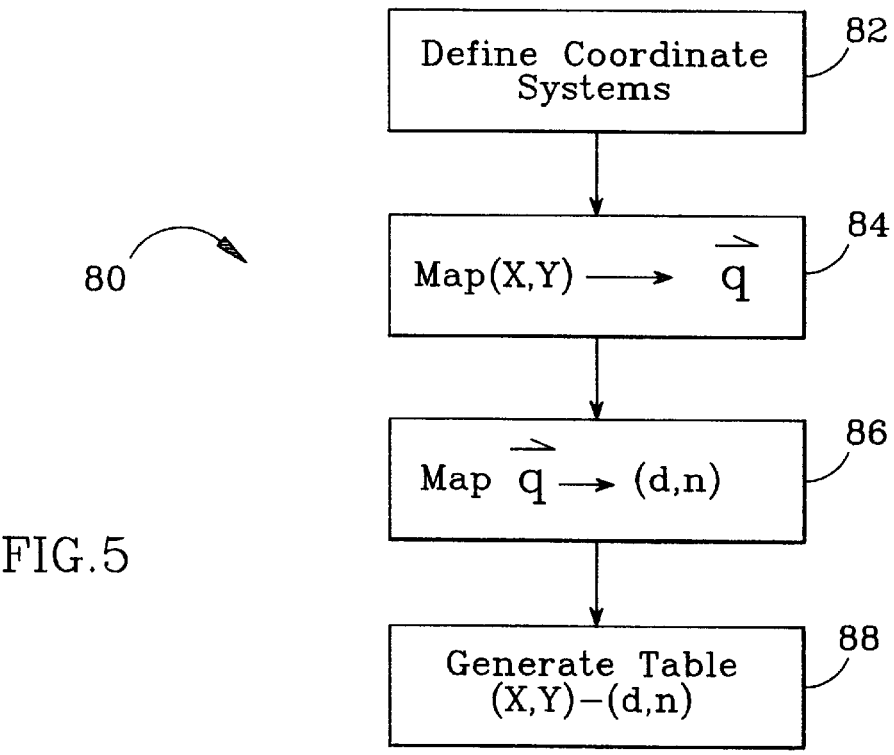
FIG. 5 is a flowchart of a cartesian-to-spherical coordinate transformation engine for generating the source and user tables.

FIG. 5 is a flowchart of a cartesian-to-spherical coordinate transformation engine 80 that is based upon the coordinate systems and mappings defined in FIGS. 2–4 and used to generate both source $(s, x_s, y_s)$-to-$(d,n)$ and user $(d,n)$-to-$(x_u, y_u)$ tables that facilitate an efficient mapping from the sensor pixels onto the virtual sphere and then onto the users' HMDs. The engine receives as inputs the desired resolution, and the object's focal length, orientation and cartesian coordinates $(x,y)$ on the object's image plane where the object is either the image source or the user display, and generates output $(x,y)$-to-$(d,n)$ tables. The user table is then inverted to produce the required $(d,n)$-to-$(x_u, y_u)$ table.

In step 82, the engine defines the coordinate systems and mappings between them including: the reference coordinate system $(\vec{x}, \vec{y}, \vec{z})$, the indexed virtual sphere (equations 1–2), the mapping from an object's image plane cartesian coordinates to vectors on the sphere (equations 8–14), and the mapping from vectors to index pairs $(d,n)$ (equations 6–7). The indexing of the virtual sphere is a function of the angular resolution. The mapping from the object's cartesian coordinates to vectors on the sphere is a function of the object's orientation $(\rho, \theta, \phi)$ and its focal length. In step 84, the engine maps object pixels $(x,y)$ to vectors $\vec{q}$ on the sphere. In step 86, the engine maps the vectors $\vec{q}$ into respective $(d,n)$ index pairs. Lastly, the engine combines the results of steps 84 and 86 to generate a table that maps pixels $(x,y)$ into $(d,n)$ index pairs (step 88).

Figure 6:
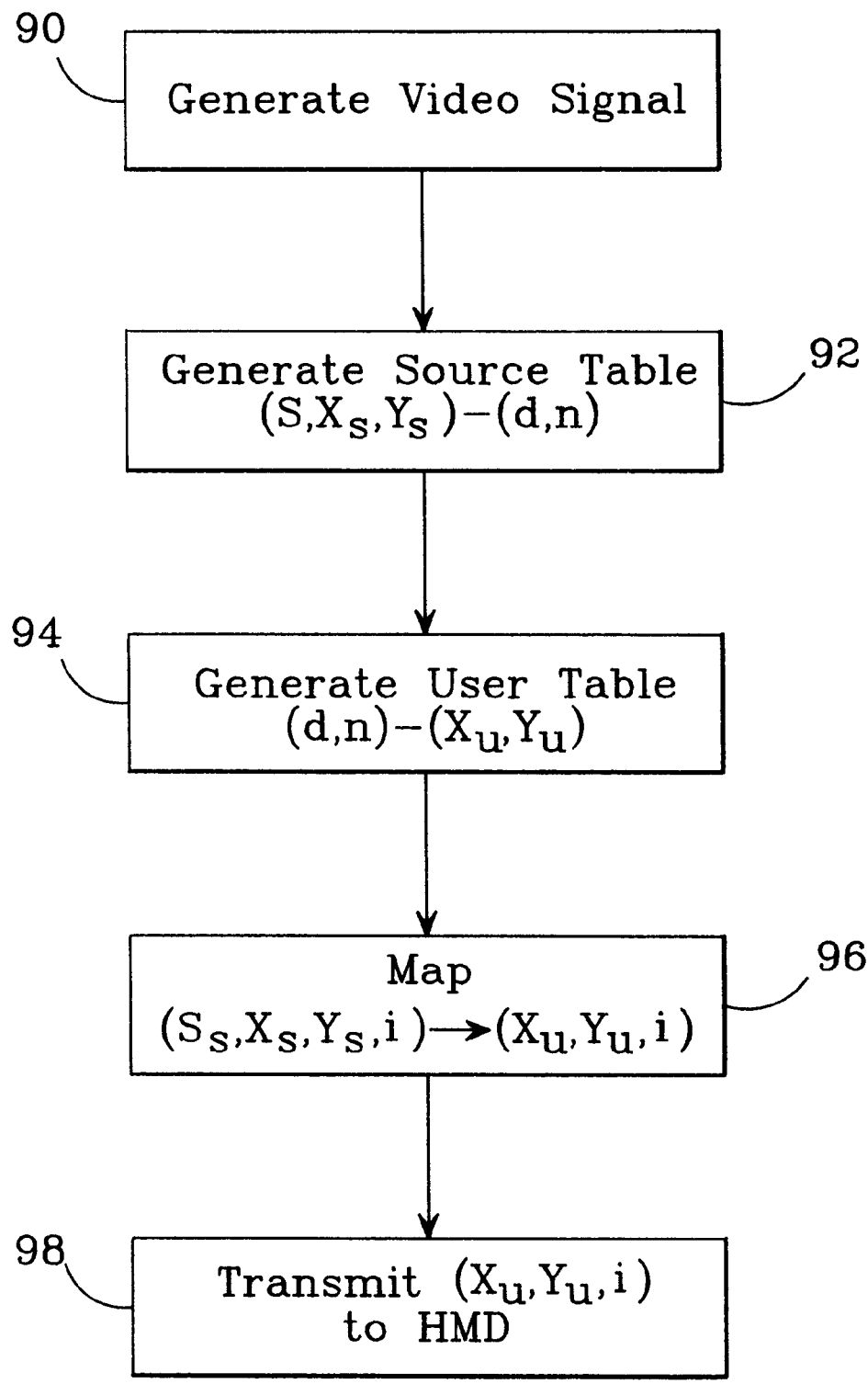
FIG. 6 is a high level flowchart illustrating the use of the source and user tables of FIG. 5 to distribute the wide FOV video signal and to independently extract and simultaneously display multiple user FOVs with uniform angular resolution.
Figure 7:
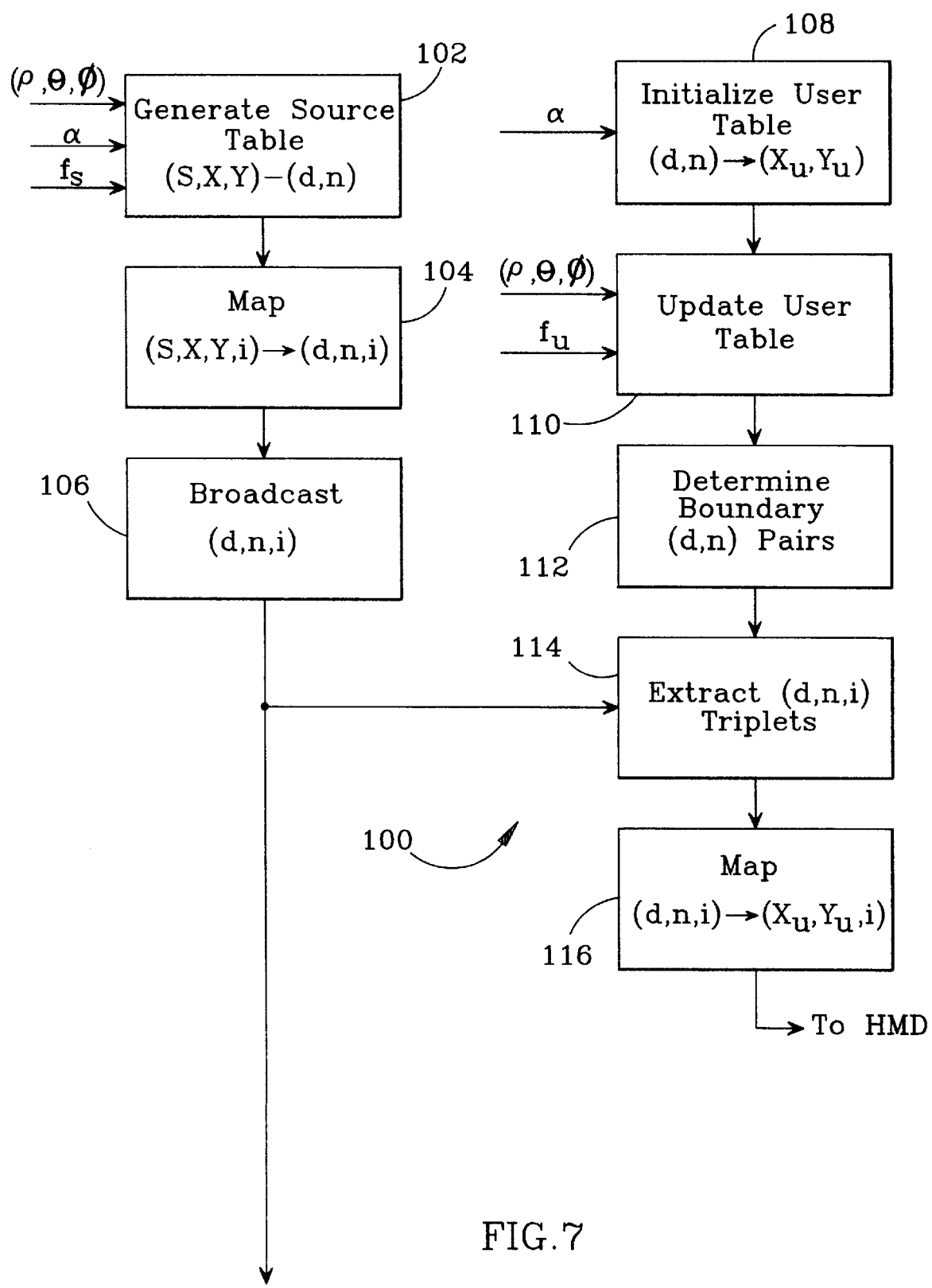
FIG. 7 is a flowchart of a fixed resolution low complexity implementation of the system shown in FIG. 6.
Figure 8:
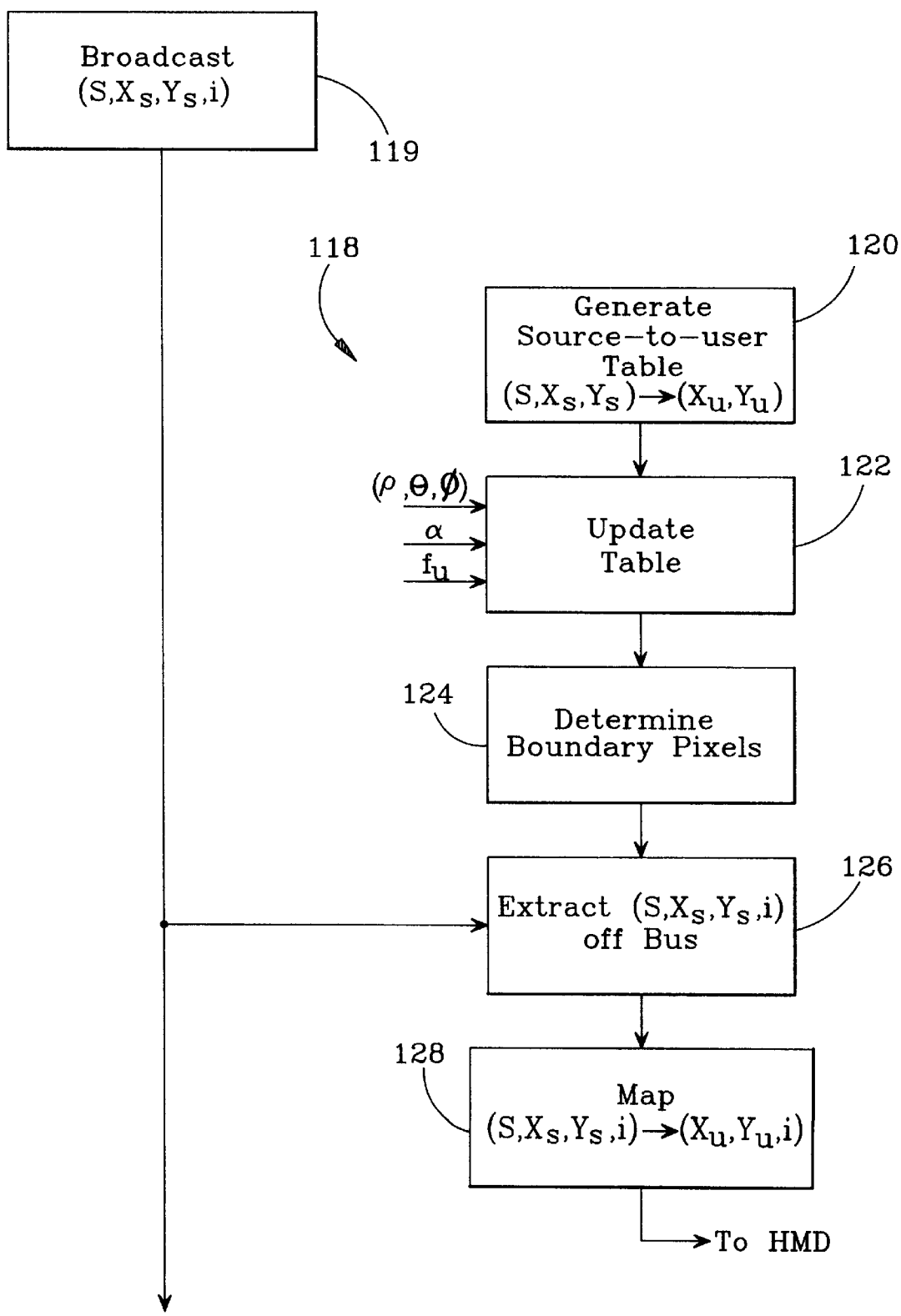
FIG. 8 is a flowchart of a variable resolution higher complexity implementation of the system shown in FIG. 6.

As shown in FIG. 6, the video signals 14, as shown in FIG. 1, are generated continuously (step 90) and directed to the distribution bus. In step 92, the engine 80 illustrated in FIG. 5 is used to generate source tables $(s, x_s, y_s)$-to-$(d,n)$ based upon each image source's orientation in the reference coordinate system, the desired angular resolution, and the focal lengths. In step 94, each local processor uses the engine to generate user tables $(d,n)$-to-$(x_u, y_u)$ based upon the user's current FOV, the desired angular resolution, and the focal lengths. The user tables are updated as the user's FOV or focal length changes. In step 96, the source and user tables are used to map the source pixels $(s, x_s, y_s, i)$ to the user pixels $(x_u, y_u, i)$, which are then transmitted to the user's HMD for display (step 98). The pixel value i is the intensity or color at each corresponding pixel. This augmented reality system can be implemented in a low complexity fixed angular resolution system, as shown in FIG. 7, or in a higher complexity but variable resolution system as shown in FIG. 8. This approach directly provides the desired uniformed angular resolution as well as distortion correction, which would normally be computed independently. In addition, the simplicity of the mapping itself and the resulting indexed representation on the virtual sphere support high resolution video, real-time response and multiple users.

As shown in FIG. 7, the low complexity fixed angular resolution system 100 is implemented by generating the source tables once at the source processor with a discrete angular resolution $\alpha$ (step 102), mapping the source pixels $(s, x_s, y_s, i)$ into triplets $(d,n,i)$ (step 104), and broadcasting them over the bus (step 106). As a result the source table does not have to be updated and the intensity values i having the same $(d,n)$ index pairs can be averaged prior to broadcast. This reduces the computational load and the required bandwidth.

The tradeoff is that the maximum angular resolution available to each user is fixed at $\alpha$. If a user zooms in to a point where the display resolution would be greater than $\alpha$, pixel replication occurs which limits the true resolution to $\alpha$. This problem can be effectively avoided by selecting a very fine $\alpha$, however this limits the bandwidth savings that can be achieved by averaging. If the user zooms out to a point where the display resolution is less than $\alpha$, some type of nearest neighbor algorithm is used to map the more finely resolved source $(d,n)$ index pairs to the more coarsely resolved user $(d,n)$ pairs. Typical algorithms are pixel-to-pixel, which results in a subsampling of the available data, pixel-to-pixel with a radius, which maps all the source pixels within one radius of the user pixel to that pixel thereby averaging the intensity values, and patch-to-pixel that operates similarly to the pixel-to-pixel with a radius.

Each local processor initializes the user table $(d,n)$-to-$(x_u, y_u)$ (step 108), and then updates the user table (step 110) as the user looks around in the virtual sphere and zooms in and out on the displayed subimage. The local processor identifies the corner $(d,n)$ index pairs (step 112) and then extracts all the triplets $(d,n,i)$ off of the bus that lie within the boundary defined by the corner index pairs (step 114). The local processor then maps the intensity values for each $(d,n)$ index pair to the corresponding cartesian coordinate $(x_u,y_u)$ using this updated user table (step 116) and transmits the $(x_u,y_u,i)$ to the HMD, which in turn displays the subimage.

As shown in FIG. 8, the higher complexity variable resolution system 118 is implemented by broadcasting the raw pixel data $(s,x_s,y_s,i)$ over the video bus (step 119). This allows each user to extract the raw pixel data and process it up to the limiting angular resolution of the image sources. However, the source tables must be calculated by each user and updated periodically. Furthermore, more bandwidth is required to broadcast the raw pixel data than is required to broadcast the triplets (d,n,i). Each local processor initializes a source-to-user table $(s,x_s,y_s)$-to-$(x_u,y_u)$ (step 120) by computing the individual source and user tables and combining them. The local processor updates the source-to-user table (step 122) as the user looks around in the virtual sphere and zooms in and out on the displayed subimage. The resolution of the table automatically changes to match the user's focal length. The local processor determines the corner $(x_s,y_s)$ pixels for each image source (step 124) and then extracts all the pixels $(s,x_s,y_s,i)$ off of the bus that lie within the boundary defined by the corner pixels (step 126). The local processor then maps the intensity values for each $(s,x_s,y_s)$ pixel to the corresponding cartesian coordinate $(x_u,y_u)$ using the updated source-to-user table (step 128), interpolates intensity values for any gaps in the display, and transmits the $(x_u,y_u,i)$ to the HMD, which in turn displays the subimage.

The source-to-user tables can be generated and updated in two distinctly different ways. First, the angular resolution α can be set to an approximately infinitesimal value, e.g. the floating point resolution of the computers such that the (d,n) index pairs have floating point values. As a result, the (d,n) pairs in the source table must be mapped to the (d,n) pairs in the user table. This is preferably accomplished using a nearest neighbor algorithm such as the pixel-to-pixel with a radius or the patch-to-pixel algorithms. As the user zooms in on the image, the resolution of the user (d,n) index pairs increases such that fewer source (d,n) index pairs are mapped to each user index pair. This effectively increases the resolution of the displayed image. Conversely, as the user zooms out on the image, the resolution of the user (d,n) index pairs is reduced such that a greater number of source (d,n) index pairs are mapped to each user index pair. Thus, more averaging occurs and the display resolution is reduced.

In the second approach, the angular resolution a can be set at a discrete value as a function of user focal length such that the (d,n) index pairs, rounded to the nearest integer, are in approximately 1-to-1 correspondence with pixels in the user's focal plane. The relationship between user focal length and angular resolution is given as follows:

$$\alpha = \frac{\text{pixel size}}{f_u} \quad (15)$$

This provides the desired angular resolution without requiring an intermediate mapping between the source and user (d,n) index pairs. The 1-to-1 mapping is only approximate due to the possibility that there may be gaps in the wide FOV video signal due to the arrangement of the image sources. As a result, a small number of user (d,n) index pairs may not have a source index pair match. This is remedied by interpolating the intensity values for neighboring index pairs.

Figure 9:
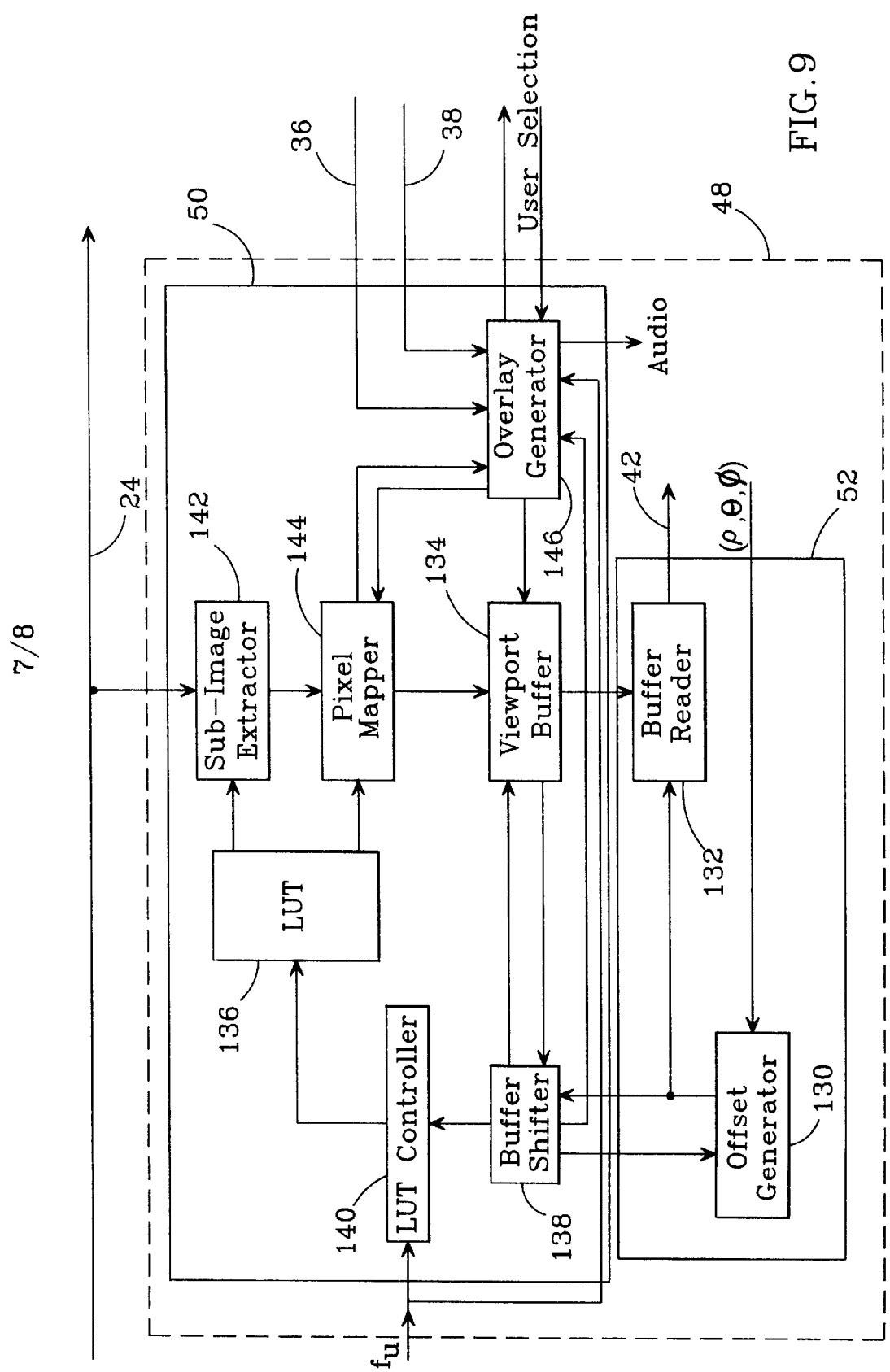
FIG. 9 is a detailed block diagram of the local processor shown in FIG. 1.

A detailed block diagram of the local processor 48 is shown in FIG. 9. The viewpoint display unit 52 includes an offset generator 130 that responds to the updated user FOV, i.e. the $(\rho,\theta,\phi)$ coordinates from the head tracker, by computing an offset between the updated subimage and the oversized subimage that is stored in the subimage capture unit 50. For example, the offset is suitably the x and y offsets from the upper left hand corner of the oversized subimage. The offset generator 130 sends the offsets to a buffer reader 132 that shifts a read pointer by the x and y offsets and sub-raster scans the requested subimage from the subimage capture unit 50. The buffer reader 132 then transmits the updated subimage 42 to the HMD.

The subimage capture unit 50 includes a viewport buffer 134 that stores the oversized subimage. The viewport buffer is suitably 10% to 20% larger than the displayed subimage. The contents of the viewport buffer are continuously refreshed as the wide FOV video signal is downloaded from the video bus 24. However, the user and source tables that are stored in a LUT 136, and hence, the FOV that defines the extent of the oversized subimage, are only refreshed when the difference between the updated user FOV $(\rho,\theta,\phi)$ and the FOV that was employed to define the current oversized subimage has changed by more than some minimum offset. This reduces the computational load and reduces the chance that glitches may occur in the user display.

A buffer shifter 138 compares the x and y offsets from the offset generator 130 to minimum and maximums offsets. If the x and y offsets are less than the minimum or greater than the maximum then the requested subimage is too close to an edge of the oversized buffer such that any further movement could exceed the boundaries of the oversized subimage and cause a glitch. As a result, the buffer shifter 138 1) generates a signal to update the user table in the LUT 136 in accordance with the updated user FOV $(\rho,\theta,\phi)$, 2) transmits a signal to the offset generator 130 to reset the offset, and 3) preferably shifts the contents in the viewport buffer 134 in accordance with the updated user FOV. If the user changes his FOV rapidly, the ability to the shift the contents will reduce any distortion or glitch in the displayed subimage.

A LUT controller 140 responds to the update signal from the buffer shifter 138 and the user's focal length to update the user table in the LUT 136, and if applicable, to update the source table. The user table is updated by recomputing the user's coordinate system $(\vec{U}_u, \vec{V}_u, \vec{b}_u)$ in accordance with the updated $(\rho,\theta,\phi)$ coordinates (equation 8), recomputing the x",y" values in accordance with the user focal length (equations 12–13) and the cartesian coordinates of the oversized subimage, recomputing the vectors $\vec{q}(s,x_u,y_u)$ (equation 14), and computing the user index pairs (d,n) (equations 6–7). When the angular resolution is selected as a function of user focal length, the values for N and D, in equations 6–7 are changed according to equations 15, 1 and 2. The source table, if included at the local processor, is only updated when the angular resolution is selected in this manner and only for changes in focal length.

A subimage extractor 142 reads out the (d,n) index pairs or the source pixels $(s,x_s,y_s)$ from the LUT 136 that lie within the updated oversized subimage, monitors the wide FOV video signal as it is transmitted over the video bus 24, and extracts the identified index pairs or source pixels. A pixel mapper 144 uses the user or source-to-user tables to map the intensity values for the extracted index pairs or pixels, respectively, into the cartesian coordinates of the oversized subimage and writes the intensities into the viewport buffer 134. If multiple intensity values are extracted for the same index pair or pixel, the pixel mapper 144 averages the intensity values. If there is a gap in the oversized subimage, the pixel mapper interpolates the intensity values for neighboring pixels to fill in the gap. The buffer reader 132 is preferably synchronized to the refresh rate of the viewport buffer 134 such that displayed subimage is refreshed at the same rate.

An overlay generator 146 receives the current oversized FOV from the buffer shifter 138, the user focal length, and any user selections such as specific classes as inputs. When all of the overlay data for the current wide FOV video signal is registered to the video signal and broadcast as (d,n) index pairs or (s,$x_s$,$y_s$) pixels plus the symbol or audio track, the overlay generator 146 extracts those symbols or audio tracks in the classes selected by the user, at the hierarchical resolution selected by the user focal length, and identified by the user or source-to-user tables from the bus 36. Alternately, the overlay generator 146 can use the GPS coordinates, the selected classes and user focal length to directly request only the desired symbols from the database. The overlay generator 146 passes the index pair (d,n) or pixel (s,$x_s$,$y_s$), typically the centroid of the symbol, to the pixel mapper 144, which returns the cartesian coordinates in the viewport buffer 134. Thereafter, the overlay generator 146 writes the overlay symbols into a second layer of the viewport buffer 134 such that they are registered to the landmarks in the video signal. The audio tracks are sent directly to the HMD, which if equipped with a spatial audio system can playback the audio tracks such that the appear to emanate from the designated coordinates in the displayed subimage or can provide a standard narrative that describes the associated landmark.

Figure 10:
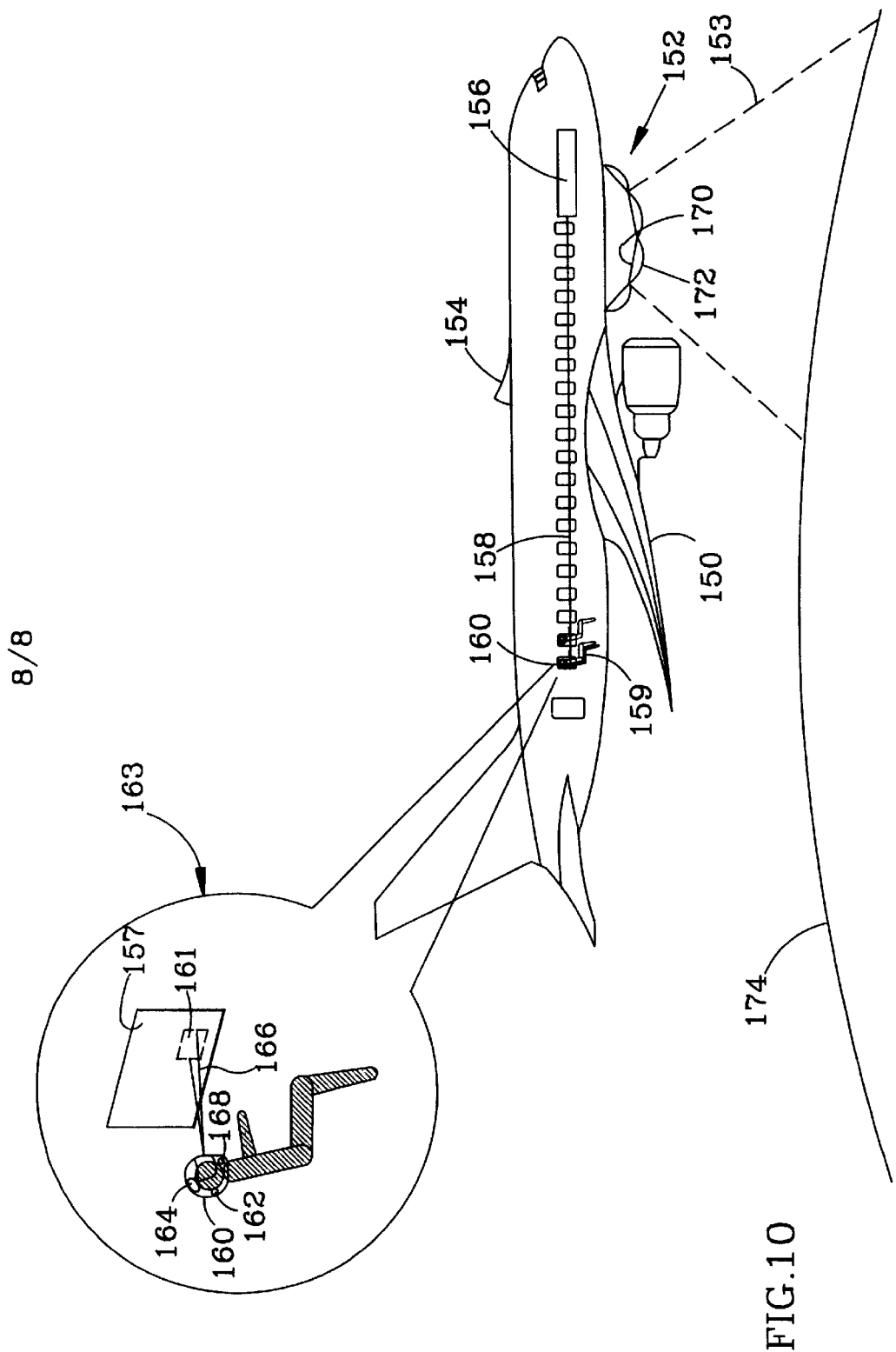
FIG. 10 is a perspective and partially exploded view of an implementation of the multi-user augmented reality system on an airplane.

FIG. 10 shows an implementation of the augmented reality system 10 on an airplane 150. A multi-sensor system 152 is attached to the underside of the airplane to image a wide FOV 153 of the hemisphere below the plane. The airplane carries a Global Positioning System (GPS) 154 that provides the plane's current position in coordinates (longitude, latitude, altitude) in a global cartesian coordinate system and the plane's heading in terms of its yaw, pitch and roll ($\alpha,\beta,\gamma$). A known GPS system is described by Orlando et al., "GPS-Squitter: System Concept, Performance, and Development Program" The Lincoln Laboratory Journal, Vol. y, No. 2, 1994, pp. 271–293. A server 156 digitizes the video signals generated by each sensor, maps them into (d,n) index pairs, and multiplexes them into a wide FOV video signal 157 that is distributed over a video bus 158 to a plurality of passengers 159. The server also extracts the overlay symbols and audio tracks in the current wide FOV, registers them to the wide FOV video signal, and broadcasts them over the bus. Alternatively, each user could request the symbols on-demand based on the current position and local FOV.

As particularly shown on an enlarged inset 163, each of the passengers wears a HMD 160 to view a subimage 161 of the wide FOV video signal. The passengers look around inside the virtual sphere to independently select and view a certain portion of the available wide FOV. Virtual I/O, Inc. produces a personal display system called i-glasses! that is suitable for use in a commercial airplane environment. Hughes Training, Inc. produces a high end ClearVue™ HMD that is typically used in military applications but could be adapted for use in the augmented reality system. The HMD 160 is fitted with an audio system 162 and a tracking device 164, such as an RF beacon or a gyro compass. The tracking device follows the user's head movement and outputs ($\rho,\theta$) or ($\rho,\theta,\phi$) coordinates that define the users FOV 166. Crystal River Engineering produces an Alphatron 3D sound card that spatializes the inputs to the audio system 162 so that the user is immersed in 3D sound. A zoom controller 168 such as a knob can be placed on the HMD to allow the passenger to zoom in and out on the video signal. Alternatively, a video screen could be positioned on the seatback in front of the passenger with a joystick used to select the local FOV. A local processor downloads digital video signal, overlay symbols and audio tracks from the distribution bus, decompresses the video signal, extracts the desired subimage from the video signal in response to the user's FOV, displays the subimage and its associated symbols on the HMD 160, and plays the audio tracks over audio system 162.

The multi-sensor system 152 preferably includes a 4×4 geodesic array of sensors 170, preferably color CCD video cameras, that are each fitted with a hemispheric "fish eye" lens 172. A second sensor array can be placed on top of the airplane for viewing star constellations, for example. The system preferably image $4\pi$ steradians of visual field in the hemisphere below the airplane. To adequately cover the visual field at two times eye limiting resolution, 1K×1K pixelated CCD color cameras are used with each covering $4\pi$ steradians or roughly 45° in the horizontal and vertical FOV. Suitable CCD color cameras are produced by Hitachi, Inc. and Panasonic, Inc. The multi-sensor system produces sixteen subimage which are processed to form the individual analog video signals. Alternately, fewer higher resolution cameras could be used.

Imaging the region below the airplane onto the sensor array introduces three types of distortion into the wide FOV video signal 157: perspective, lens, and edger distortion. Perspective distortion is unavoidable, and is caused by the perspective view of the earth 174 from the sensors array. The region directly below the airplane at the center of the array's FOV is sensed with greater resolution than regions towards the periphery of its FOV. Thus, objects towards the periphery appear progressively closer together and are perspectively distorted.

Lens distortion results from the physical properties of the fish eye lens 172, which cause the pixels towards the edges of the CCDs to subtend progressively larger angles. This exacerbates the perspective distortion. Processing techniques for correcting the fish eye distortion are well known and included at the server. Edge distortion is caused by tiling the 4×4 CCD sensors together into a geodesically shaped array. In this configuration, the 16 subimages 49 sensed by the individuals CCDs do not match at their adjoining edges. However, the mapping from the cartesian coordinate space onto the virtual sphere automatically corrects for edge distortion.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An augmented reality system for displaying landmarks to at least one user, comprising:

at least one image source positioned at a known orientation with respect to a center of a virtual sphere in which points on said virtual sphere are represented as spherical coordinate pairs (d,n) that respectively denote segments and rings of said virtual sphere, said image source generating video signals that together form a wide field of view (FOV) video signal having pixels (s, $x_s$,$y_s$,i) in which s identifies said image source, ($x_s$, $y_s$) are cartesian coordinates of pixels on an image plane of said image source, and i is a pixel value:

a source processor that maps said pixels (s,$x_s$,$y_s$,i) into spherical coordinate triplets (d,n,i);

a storage device that stores landmark data including overlay symbols and audio tracks that correspond to said wide FOV video signal;

a video bus for broadcasting the triplets (d,n,i) to multiple users;

a system for obtaining the user's viewpoint orientation;

at least one user display system, comprising:

a) a display for displaying a respective subimage of said wide FOV video signal with an image plane of said display represented in cartesian coordinates ($x_u$,$y_u$); and b) a user controllable viewpoint selector for selecting said respective subimage in the wide FOV video signal wherein a center of said virtual sphere is defined as a fixed position of an user using said display; and at least one local processor for:
mapping pixels $(x_u, y_u)$ of said respective subimage to respective spherical coordinate pairs (d,n);
extracting from said video bus, a respective set of said spherical triplets (d,n,i) that correspond to said respective set of said spherical coordinate pairs (d,n), and
remapping said respective set of spherical triplets (d,n, i) to pixels $(x_u, y_u, i)$ in said image plane, and
wherein said local processor, in response to user selection, is capable of mapping selected portions of said overlay symbols and audio tracks to cartesian coordinates $(x_u, y_u)$ of said image plane.

2. The augmented reality system of claim 1, wherein said display and said user controllable viewpoint selector respectively comprise:
a head mounted display (HMD) that is worn by said user; and
a head tracker on said HMD that tracks head movements of said user.

3. The augmented reality system of claim 1, further comprising:
a distribution processor; and
wherein said system for obtaining the user's viewpoint orientation is capable of obtaining the position and heading of the user, and said distribution processor is capable of extracting in response to said position and heading, overlay symbols and audio tracks that correspond to said wide FOV video signal.

4. The augmented reality system of claim 3, further comprising:
an overlay distribution bus for distribution of overlay symbols and audio tracks.

5. The augmented reality system of claim 1, wherein said positioning system includes a Global Positioning Satellite System.

6. The augmented reality system of claim 1, wherein said user display system further comprises a user controllable zoom mechanism for zooming in and out on said respective subimage.

7. A method of providing an augmented reality system for displaying landmarks to at least one user, comprising the steps of:
defining a virtual sphere in which points on said virtual sphere are represented as spherical coordinate pairs (d,n) that respectively denote segments and rings of said virtual sphere and a center of said virtual sphere is defined as a fixed position of said user;
generating at least one video signal from a known orientation in said virtual sphere that forms a wide field-of-view (FOV) video signal having pixels $(s, x_s, y_s, i)$ in which s identities said video signal, $(x_s, y_s)$ are cartesian coordinates of pixels within said video signal, and i is a pixel value;
mapping said pixels $(s, x_s, y_s, i)$ into spherical coordinate triplets (d,n,i);
broadcasting said spherical coordinate triplets (d,n,i) over a video bus to said at least one user;
tracking a viewpoint orientation for said user that defines a subimage in said wide FOV video signal;
in response to said viewpoint orientation, mapping cartesian coordinates $(x_u, y_u)$ of pixels in a user display to respective spherical coordinate pairs (d, n);
in response to said mapping steps, identifying a set of said spherical coordinate (d,n,i) triplets that corresponds to said subimage;
in response to said identifying step, remapping said set of spherical coordinate (d,n,i) triplets to pixels $(x_u, y_u, i)$ in said user display;
storing landmark data including overlay symbols and audio tracks that correspond to said wide FOV video signal; and
in response to user selection, providing respective portions of said landmark data that are within said subimage to said user display.

8. The method of claim 7, wherein said defining step includes the step of generating said spherical coordinate pairs (d,n) with an angular resolution $\alpha$ and further including a step of adjusting a focal length for said user to zoom in and out on said subimage.

9. The method of claim 7, further comprising the steps of:
obtaining the position and heading of said user; and
in response to said position and heading, providing respective portions of said overlay symbols and audio tracks to said user display that are within said subimage; and
wherein said providing step includes the steps of:
registering said overlay symbols and audio tracks to respective spherical coordinate pairs (d,n);
in response to said registering step, extracting said respective portions; and
mapping said respective portions to said user display.

10. The method of claim 9, wherein the step of providing respective portions of said overlay symbols and audio tracks comprises distributing said respective portions over an overlay distribution bus.

11. The method of claim 7, wherein said user display is a head mounted display and said tracking step includes the step of monitoring the head movement of said user to establish said viewpoint orientation.

12. The method of claim 7, wherein said obtaining step includes the step of employing a Global Positioning Satellite System.

13. An airplane fitted with an augmented reality system for displaying landmarks to the user, comprising:
a plurality of sensors each attached to the underside of the airplane and providing a video signal of the hemisphere below the airplane;
a server for digitizing the video signal provided by each of said plurality of sensors, mapping the video signal into spherical coordinate (d,n) pairs and multiplexing the video signal provided by each one of said plurality of sensors into a wide field of view (FOV) signal, wherein the server also broadcasts landmark data including overlay symbols and audio tracks corresponding to the wide FOV signal;
a video bus for distributing said wide FOV signal to a plurality of passengers on board said airplane;
a system for obtaining the viewpoint orientation of each one of said plurality of passengers;
user display systems, each said display system comprising:
a) a display for displaying a respective subimage of said wide FOV video signal with an image plane ot said display represented in cartesian coordinates $(x_u, y_u)$; and
b) a user controllable viewpoint selector for selecting said respective subimage in the wide FOV video signal wherein a center of said virtual sphere is defined as a fixed position of the passenger using said display; and local processors, wherein each local processor is for;
 mapping pixels $(x_u,y_u)$ of said respective subimage to respective spherical coordinate pairs (d,n);
 extracting from said video bus, a respective set of spherical triplets (d,n,i) that correspond to said respective spherical coordinate pairs (d,n), and
 remapping said respective set of spherical triplets (d,n,i) to pixels $(x_u,y_u,i)$ in said image plane, and wherein each said local processor, in response to user selection is capable of mapping selected portions of said overlay symbols and audio tracks to cartesian coordinates $(x_u, y_u)$ of said image plane.

14. The airplane of claim 13, wherein said system for obtaining the viewpoint orientation includes a subsystem for obtaining the positioning and heading of the passenger.

15. The airplane of claim 14, wherein said subsystem is a Global Positioning System.

* * * * *